US010853196B2

United States Patent
Natanzon et al.

(10) Patent No.: US 10,853,196 B2
(45) Date of Patent: Dec. 1, 2020

(54) PRIORITIZING MICROSERVICES ON A CONTAINER PLATFORM FOR A RESTORE OPERATION

(71) Applicant: EMC IP Holding Company LLC, Hopkinton, MA (US)

(72) Inventors: Assaf Natanzon, Tel Aviv (IL); Luay Al-Alem, Lynnfield, MA (US); Antony Bett, Shrewsbury, MA (US); Michael Rhodes, Stamford, CT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 225 days.

(21) Appl. No.: 16/053,976

(22) Filed: Aug. 3, 2018

(65) Prior Publication Data

US 2020/0042406 A1     Feb. 6, 2020

(51) Int. Cl.
*G06F 11/14*     (2006.01)
*G06F 16/27*     (2019.01)
*G06F 16/245*     (2019.01)

(52) U.S. Cl.
CPC ........ *G06F 11/1469* (2013.01); *G06F 16/245* (2019.01); *G06F 16/27* (2019.01); *G06F 2201/84* (2013.01)

(58) Field of Classification Search
CPC .... G06F 16/245; G06F 16/27; G06F 11/1469; G06F 11/1482; G06F 2201/84
See application file for complete search history.

(56) References Cited

U.S. PATENT DOCUMENTS

| 10,439,987 | B2 * | 10/2019 | Church | H04L 43/062 |
| 2018/0019948 | A1 * | 1/2018 | Patwardhan | H04L 47/2475 |
| 2019/0116124 | A1 * | 4/2019 | Pignataro | H04L 47/32 |
| 2019/0123970 | A1 * | 4/2019 | Rastogi | H04L 43/08 |
| 2019/0238636 | A1 * | 8/2019 | Li | H04L 67/1095 |
| 2019/0273746 | A1 * | 9/2019 | Coffing | H04L 63/105 |
| 2019/0340059 | A1 * | 11/2019 | Bagarolo | G06F 11/0793 |

* cited by examiner

*Primary Examiner* — Scott A. Waldron
(74) *Attorney, Agent, or Firm* — Workman Nydegger

(57) ABSTRACT

Systems and methods for discovering applications. An application may be discovered by determining a topology of the application in a containerized platform. Discovering the topology may include determining the components of the application and then determining relationships between the components. The relationships may include whether a component (e.g., a microservice) is user facing and may be based on traffic patterns between the components. The components or microservices may be prioritized or ranked based on the topology. The topology can be used when performing a data protection operation such as a restore operation.

20 Claims, 5 Drawing Sheets

PRIORITIZING MICROSERVICES ON A CONTAINER PLATFORM FOR A RESTORE OPERATION

FIELD OF THE INVENTION

Embodiments of the present invention relate to systems and methods for performing data protection operations. More particularly, embodiments of the invention relate to systems for discovering applications including containerized applications and/or microservices

BACKGROUND

The manner in which applications are developed and deployed is constantly evolving. Currently, some applications are developed and deployed using containers. Containerized applications provide a number of advantages. Containers can be updated and scaled easily. In fact, containerized applications are updated frequently. Further, it is possible to update portions or specific containers independently of other portions of the application. As a result, protecting a containerized application (e.g., backing up the application) becomes much more difficult.

For example, a containerized application may include multiple microservices (each operating, by way of example, in a container). In order to provide data protection operations to a containerized application, it is necessary to fully understand or identify the components of the application (e.g., the microservices) and it is necessary to understand the relationships between the various components of the containerized application. Systems and methods are needed for discovering applications including containerized applications.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to data protection systems and methods. Data operations performed by data protection systems include backup operations, restore operations, replication operations, de-duplication operations, discovery operations, or the like or combination thereof.

Embodiments of the invention further relate to systems and methods for discovering the topology of an application such as containerized application.

More particularly, embodiments of the invention are directed to discovering an application. This may include determining the topology of the application. The topology may include identifying the components of the application and the relationships of those components. Once the topology is determined (and updated as necessary or periodically), the components (e.g., microservices) of the application can be prioritized or ranked. The topology and/or prioritization can be used in performing data protection operations. For example, in a restore operation, highly ranked microservices may be restored before lower ranked microservices are restored.

By way of example, a container may be a packaged piece of software that includes everything needed to run. Often, a microservice is run inside a container or in the context of a container. This may include code, runtime, system tools, libraries, settings, and the like.

A container platform is capable of orchestrating or managing container operations or containerized workloads and services. The container platform may orchestrate computing, networking, and storage infrastructure on behalf of user workloads. A container platform can simplify platform as a service (PaaS) and infrastructure as a service (IaaS) and enables portability across different infrastructures. Kubernetes (see https.//kubernetes.io, which is incorporated by reference) is an example of a platform that automates or orchestrates container operations. The container platform may be configured to manage or control containerized applications that are deployed across multiple hosts, scale applications, and the like.

The following discussion initially provides a description of a container platform and a service mesh platform. These platforms can be configured to allow the topology of the application to be discovered and used in performing data protection applications.

Figure 1:
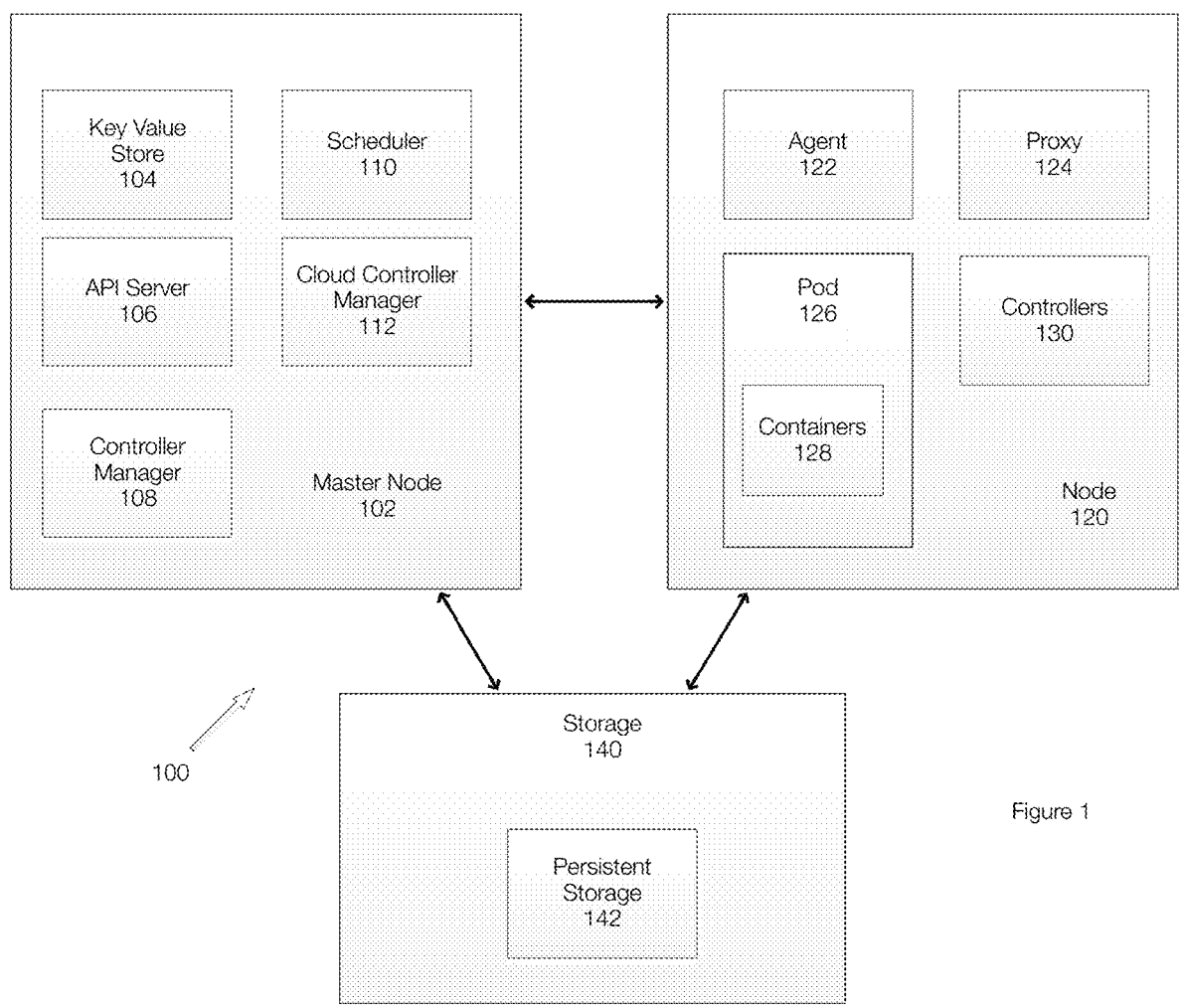
FIG. 1 illustrates an example of a container platform suitable for containerized applications.

FIG. 1 illustrates an example of a container platform that is configured to schedule and run containerized applications on clusters. The clusters may include physical and/or virtual machines. The container platform may orchestrate computing, networking, and storage infrastructure on behalf of user workloads.

The container platform 100 shown in FIG. 1 may include a master node 102, a node 120 (representative of a plurality of nodes or of a cluster of nodes), and storage 140. Applications running in the container platform 100 may include containers, microservices, back end services, access points (APIs or Application Programming Interfaces) or the like.

The master node 102, which may be present on a single node or spread across a plurality of nodes, may include by way of example various components. These components may include a key value store 104, a scheduler 110, an API server 106, a controller manager 108 and a cloud controller manager 112. T The components of the master node 102 are configured to provide a control plane and make decisions related to the cluster. The master node 102 may make decisions regarding scheduling, detecting and responding to cluster events, or the like.

Master components provide the cluster's control plane. Master components make global decisions about the cluster (for example, scheduling), and detecting and responding to cluster events (starting up a new pod when a replication controller's 'replicas' field is unsatisfied).

The key value store 104 is a component of the container platform that stores cluster data. For example, the key value store 104 may store configuration data that can be used by each of the nodes in the cluster. The key value store 104 can be used for service discovery and represents the state of the cluster. Each component of the container platform may be able to reference the key value store 104 to configure or reconfigure themselves. The key value store 104 may be accessed by, for example, a HTTP/JSON API. Thus, the key value store 104 is associated with an interface that allows values stored in the key value store 104 to be accessed or set as required. The key value store 104 may be stored as a single master node or distributed among a number of master nodes or machines. The key value store 104 is typically available to each node in the cluster.

The API server 106 is typically configured to expose an API or an access point for the container platform 100. The API server 106 functions as a front-end and allows a user to configure workloads and organizational units operating in the container platform 100. The API server 106 may also be responsible for ensuring that the key value store 104 and the service details of deployed containers are in agreement. The API server 106 acts as a bridge between various components to maintain cluster health and disseminate information and commands.

The API server 106 may implement an interface (e.g., a RESTful interface), which allows many different tools and libraries to communicate with the API server 106. A client may be used from a local computer to interact with the container platform 100.

The controller manager 108 is configured to run various controllers. A node controller, for example, is responsible for detecting and responding to node events, such as when a node fails or goes down. A replication controller is configured to maintain a correct number of pods for every replication controller object in the container platform 100. An endpoint controller is configured to populate endpoint objects, for example joining services and pods. A service account and token controller is configured to create accounts and API access tokens for new namespaces.

The details of these operations are written to the key value store 104. The controller manager 108 watches for these changes through the API server 106. When a change is detected or seen, the controller manager 108 (or relevant controller) reads the new information in the key value store 104 and implements a procedure to fulfill the desired state. This may include, for example, scaling an application, adjusting endpoints, or the like.

The scheduler 110 is a component that may be configured to select a node on which newly created pods should run. For example, the scheduler 110 may account for a service's operating requirements and the current infrastructure and then place the work or the new pods on an acceptable node or nodes. The scheduler 110, when making scheduling decisions, may account for various factors such as individual and collective resource requirements, hardware/software/ policy constraints, affinity and anti-affinity specifications, data locality, inter-workload interference and deadlines.

The cloud controller manager 112 may operate as a daemon and may embed cloud-specific control loops. The cloud manager 112 may allow the code of cloud vendors and the code of the container platform 100 to evolve independently of each other.

Some controllers may have dependencies on the cloud provider in which the container platform 100 is implemented. A node controller is configured to check the cloud provider to determine if a node has been deleted in the cloud after the node stops responding. A route controller is configured to set up routes in the cloud infrastructure. The service controller is configured to create, update, and delete cloud provider load balancers. A volume controller is configured to create, attach, and mount volumes. The volume controller may interface with the cloud provider to orchestrate cloud volumes.

FIG. 1 also illustrates a node 120, which is representative of multiple nodes. The node 120, and others similarly configured, perform work in the cluster. The node may include components that are substantially present on all of the node sin the cluster.

The node 120 may provide a container runtime, which is software responsible for running containers. The node 120 may also include or be associated with an agent 122. The agent 122 typically runs on each node in the cluster and ensures that containers 128 are running in a pod 126. The agent 122 may relay information to and from the control plane (the components on the master node 102). The agent 122, for example, may interact with the key value store 104 to read configuration details or write new values. The agent 122 may communicate with the components on the master node 102 to receive commands and to perform work. The work is often received in a form that defines the workload and the operating parameters. The agent 122 may also assume responsibility for maintaining the state of the work on the node 120.

The proxy 124 may be configured to maintain network rules on the node 120 and perform connection forwarding. For example, the proxy 124 may forward requests to the correct containers, perform some load balancing, and may ensure that the networking environment is predictable and isolated.

The pod 126 may be used to deploy an application. The pod 126 may represent a running process, for example. In this example, the pod 126 encapsulates one or more containers 128, storage resources, a unique network IP, and options that govern how the container(s) should run.

The pod 126 represent a unit of deployment or a single instance of an application. Thus, a single instance of an application may include a single container or a small number of containers that are highly related and that share resources. As a result of these relationships, the containers are typically scheduled on the same node. The containers 128 of the pod 126 are managed as a unit. More specifically, the containers 128 may share volumes and IP space. The containers 128 can be deployed and scaled as a single application. For example, the pod 126 may include a main container that satisfies the general purpose of the pod, and optionally some helper containers that facilitate related tasks. These are programs that benefit from being run and managed in their own container, but are heavily tied to the main application.

The node 120 may also be associated with controllers 130. A replication controller, for example, ensures that that a specified number of pod replicas are running at any one time. In other words, the replication controller ensures that a pod or a homogeneous set of pods is always up and available in the cluster.

A deployment controller provides declarative updates for pods. The deployment controller changes the actual state to a desired state at a controlled rate. A stateful set controller may update a stateful set object, which defines a desired state. A daemon set control ensures that all or some nodes run a copy of a pod. When nodes are added to the cluster, pods are added to the new nodes. As nodes are removed from the cluster, the pods are cleaned up or garbage collection is performed. Deleting a daemon set, for example, will clean up the pods created by the daemon set. A garbage collection controller may delete object that no longer have an owner.

A job controller creates one or more pods and ensures that a specified number of the pods successfully terminate. As pods successfully complete a job, the job controller tracks the successful completions. When a specified number of successful completions is reached, the job itself is complete. Deleting a job will clean up the pods it created.

The container platform may also provide services such as load balancing and networking. A service in a container platform may define a logical set of pods and a policy by which the set of pods are accessed—for example a microservice. A microservice may also be encompassed within a container.

In one example, a service may act as a basic load balance and ambassador for other containers. A service may group together logical collections of pods that perform the same function to present them as a single entity. This allows a service unit that is aware of all of the backend containers to pass traffic to to be deployed. External applications only need to worry about a single access point, but benefit from a scalable backend or at least a backend that can be swapped out when necessary. A service's IP address remains stable, abstracting any changes to the pod IP addresses that can happen as nodes die or pods are rescheduled. Services are an interface to a group of containers so that consumers do not have to worry about anything beyond a single access location. By deploying a service, discover-ability is gained and container design is simplified.

FIG. 1 also illustrates storage 140. The storage 140 is associated with the cluster (e.g., the node 120 and the master node 102) and may include distinct storage devices. For example, each node may be associated with its own storage.

Managing storage is a distinct problem from managing compute. The container platform may abstract the manner in which storage is provided and the manner in which storage is consumed. In FIG. 1, the persistent storage 142 represents storage in the cluster that has been provisioned. More specifically, a persistent volume is a resource in the cluster. Similarly, the node is a cluster resource. Persistent volumes may be implemented as plug ins. In one example, a persistent volume may have a lifecycle independent of any individual pod that uses the persistent volume. The storage 140 including the persistent storage 142 may be, by way of example only, NFS, iSCSI, or a cloud-provider-specific storage system.

A user, or microservice, or node, or the like may make a request for storage. The request for storage is similar to a pod. A pod may consume node resources and requests for storage may consume persistent storage or persistent volumes. Pods can request specific levels of resources (CPU and Memory). Requests can request specific sizes and access modes (e.g., can be mounted once read/write or many times read-only).

While persistent volume requests allow a user to consume storage, embodiments of the invention allow for persistent volumes with varying properties, such as performance. In addition to different sizes and access modes, persistent volumes are offers that over varying properties such as performance.

In order to backup up a container platform system (e.g., a Kubernetes system) or an application running therein, there is a need to restore all of the persistent components of the system. In order to restore all of the persistent components, an understanding of the topology is needed.

Embodiments of the invention thus relate to a discovery operation in the container platform. Embodiments of the invention discover components of a containerized application and relationships between the components. The various components, such as microservices, can be ranked or prioritized in preparation or anticipation of a data protection operation such as a restore operation. Higher ranked or prioritized components may be restored before lower priority or lower ranked components.

The key value store 104 allows various operations that may include, by way of example:
Setting the value of a key
Get the value of a key
Changing the value of a key
Deleting a key
Using key TTL (have a key expiry time)
Refreshing key TTL
Waiting for a change
Atomically Creating In-Order Keys
Using a directory TTL
Atomic Compare-and-Swap
Atomic Compare-and-Delete
Creating Directories
Listing a directory
Deleting a Directory
Creating a hidden node (item which will not be shown when listing directory)
Setting a key from a file
Read Linearization Container platforms are often used to deploy, as discussed herein, containerized applications. In one example, a container platform can be used in conjunction with a microservice architecture. Microservices, for example, may be deployed in containers as previously stated. As a result, a microservice and a container may be similar if not the same in some situations. In addition, a microservice may be deployed as a virtual machine.

More specifically, containers and microservices are used to build applications and are distinct from a monolithic application. Containers often contain discrete components of an application along with necessary resources. Containers can run practically anywhere and multiple containers can be deployed in a single machine or a single virtual machine.

A microservice may, by way of example, be an application with a small number of functions—often a single function (e.g., routing traffic, analyzing a result, processing a payment, storing data, etc.). Containers are often used to develop and deploy microservices. As a result, container platforms facility management of applications that include multiple microservices.

One of the benefits of containers and microservices is that the development of the application is improved. For example, a container can be upgraded by simply overwriting or replacing the present container (which may be running) with the new container. Thus, the microservice can be updated, restored, etc., by writing the binary.

However, as the transition from monolithic applications to a container or microservice-based architecture occurs, there are various challenges. In particular, understanding a distributed microservice architecture is among the challenges. Istio (see Istio.io, which is incorporated by reference) is an example of an microservices or mesh platform that allows microservices to be connected and managed. A mesh platform such as Istio may be deployed in a container platform such as Kubernetes.

A service mesh is often used to describe a network of microservices that make up an application and to describe the interactions between the microservices. Capabilities of a mesh platform may include discovery, load balancing, failure recovery, metrics, monitoring, AB testing, canary releases, rate limiting, access control and end-to-end authentication.

A mesh platform may provide various services such as the following. One service is traffic management, which controls the flow of traffic and API calls between microservices. Another service is observability, which provides understanding related to the dependencies between microservices. Observability may also identify the flow of traffic between microservices. Policy enforcement is a service that relates to policies. Policy enforcement ensures polices are enforced. In some examples, policy changes can be made by configuring the mesh platform. Service identify and security services ensures that microservices are provided with a verifiable identify and allows traffic to be protected in varying levels.

The capabilities of a mesh platform can reduce dependencies between the microservices themselves or with respect to the application code as a whole. This makes implementation easier and allows applications to be more easily deployed to different environments and to new and different policy configurations.

Embodiments of the invention relate to discovering the structure and/or topology of an application in the context of a cloud native application while accounting for remote services and clusters. In an application such as a cloud native application (which may include containers/microservices), some of the microservices or components of the application may be relatively more important. When discovering an application, embodiments of the invention discover all components of an application as well as their relative importance. For example, a user-facing microservice may be more important than a non-user facing microservice. Embodiments of the invention are able to discover the microservices of an application as well as how the microservices are connected in real-time.

Microservices are typically composed of one or more of the following parts:
  Container image
  Container metadata
  Environment Variables
  Attached Storage, (persistent volumes)
  Remote services, (databases, message system).
  Platform configuration (scale, state, etc.)
  Host details (where the containers are running)
  Ingress and egress traffic In one embodiment, the container platform may provide an API that allows these details to be determined or extracted. For example, with Kubernetes, executing a GET may result in container details, (name and location), container metadata, attached storage, (persistent volume claims) and the platform confirmation details, (such as the number of container instances, cpu/memory requirements, etc.).

This API may be monitored in order to determine any changes in the containerized application including a state of the microservices (such as failed pods or increase/decrease in scale factors), new/deleted microservices, and updated microservices, (e.g. rolling upgrades or blue/green deployments). If any change is discovered in the course of monitoring the API (e.g., by performing repeated calls to the API and comparing the new information with old information) then the application topology and component prioritization may be modified.

However, this information is not always sufficient to determine the topology and/or structure of the containerized application because the container platform API may not provide information related to how each microservice (pod/deployment/etc.) connects to each other.

This information may be obtained by querying the mesh platform. This is achieved, in one example, using a mesh API. The mesh API may return information that includes the routes of all traffic to and from interconnected microservices. The mesh API allows relationships between the application components (e.g., containers, microservices, volumes, back end, etc.) to be determined. The mesh platform may include listeners, for example, that allow the routes that flow through all of the microservices on the platform to be monitored. This information allows the application to be created and updated in real-time. More specifically, this allows the topology of an application to be created an updated in real-time.

Figure 2:
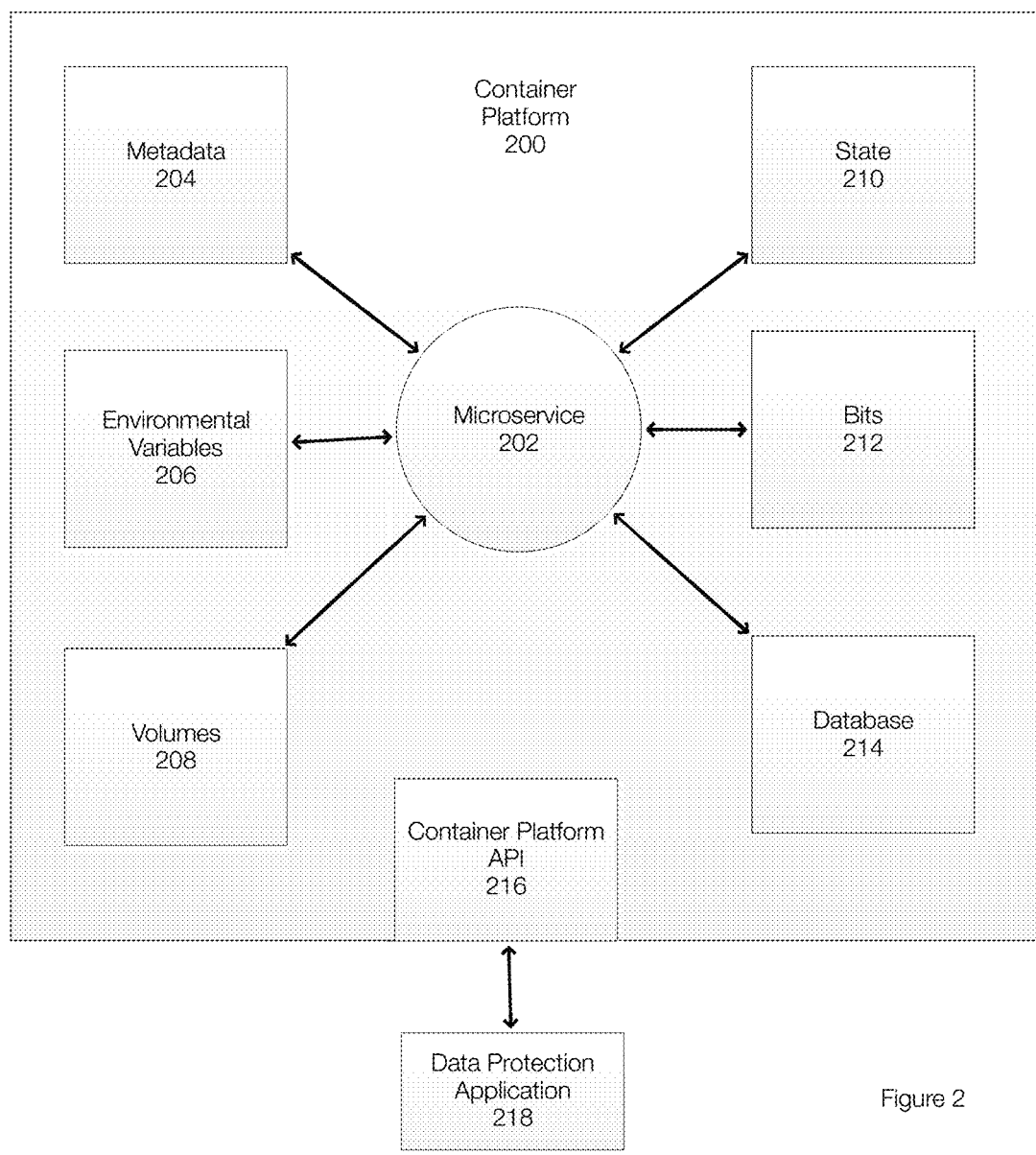
FIG. 2 illustrates an example of a container platform and information that may be extracted from the container platform.

FIG. 2 illustrates an example of a container platform 200 in which an application may run. FIG. 2 illustrates a microservice 202, but other components such as illustrated in FIG. 1 may be present. Further, the application may include multiple microservices. The container platform 200 is associated with a container platform API (Application Programming Interface) or access point, which may be a URL. The API 216 may be queried by a client such as a data protection application 218.

The response to a query at the API 216 allows the components of the application to be discovered. In addition to discovering the microservices and other components, metadata may also be discovered. The response to the query may include metadata 204, environmental variables 206, volumes 208 including persistent volumes, state 210, bits 12 and a database 214 (or other backend service). The response to a query via the API 216 may include container details (name and location), number of container instances, processor/memory requirements, and the like.

By monitoring the container platform 200, for example by periodically querying the API 216, changes in the state of the microservices can be ascertained. For example, failed pods, increase or decrease in scale factors, new or deleted microservices, updated microservices. As changes are detected, this information can be used to update the application topology.

The response to the query submitted to the API 216 may allow the components of the application to be identified. This may include the identification of several microservices.

Figure 3:
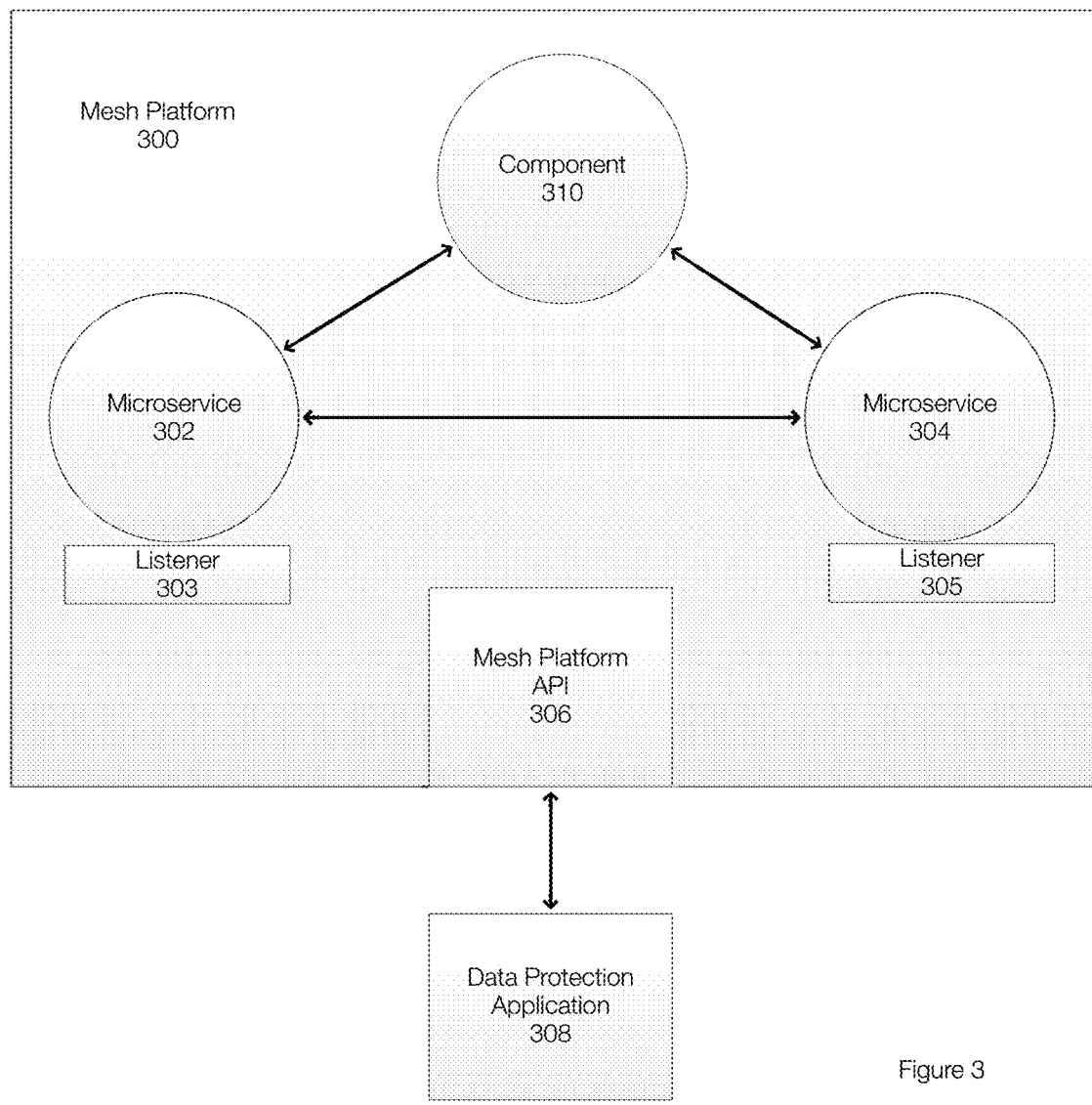
FIG. 3 illustrates an example of a mesh platform and information that may be extracted from the mesh platform.

FIG. 3 illustrates an example of a mesh platform 300. The mesh platform 300 may run in the context of the container platform, such as the container platform 200 shown in FIG. 2. In FIG. 3, a client such as the data protection application 308 (or 208) may make q query to the mesh platform API 306.

The response to the query through the API 306 may include information that allows the relationships among the components of the application to be determined. Thus, the discovery of the application may include identifying the components of an application by querying the container platform and then discovering or determining relationships between the application components by querying the mesh platform.

More specifically, the mesh platform 300 may include listeners (e.g., listeners 303 and 305). In this example, the listener 303 is attached to the microservice 302 and the listener 305 is attached to the microservice 304. These listeners allow the routes 312, 214 and 316 to be monitored. More generally, routes in the application can be listened to. This information allows the relationships between the microservices and other components (e.g., the relationships between microservice 302 and 304, between microservice 302 and component 210, and between microservice 304 and component 310) to be monitored and incorporated into the topology of the application. Stated differently, the mesh platform and the mesh platform API 306 allows the routes of all traffic to and from the interconnected microservices.

For example, traffic that arrives at a microservice from outside allows the microservice to be identified as a user-facing application (e.g., has a user interface or an API or access point). In other words, ingress traffic to a platform can be used to identify the microservices that are user-facing. This traffic may then be passed to or may generate traffic to other microservices. These microservices may be identified as internal or low level microservices. In one example, ingress and egress traffic can be used to categorize a microservice. By way of example, thresholds can be used to distinguish between the levels at which applications are categorized, prioritized, or ranked.

More specifically, when the topology of an application is complete, the components or pieces of the application can be evaluated to determine relative importance. For example, using a service mesh and (if necessary) a load balancer, microservices that are user-facing can be determined. User facing microservices typically have, as previously stated, a graphical user interface, or an application programming interface. This can be done by monitoring ingress traffic to the platform and determining what microservice(s) that traffic initially hits. With that initial discovery of user-facing services, you can then use service meshes to determine the services that connect to user-facing services and those that are lower level in the system and label them appropriately.

Figure 4:
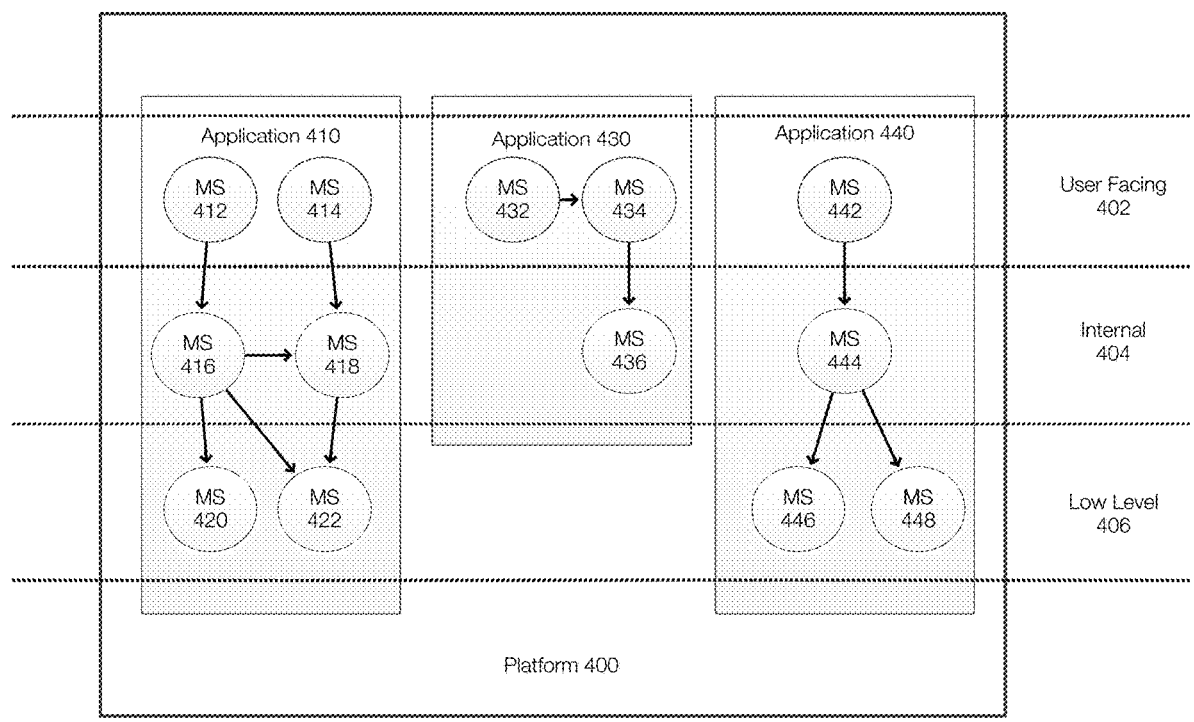
FIG. 4 illustrates an example of applications that have been discovered and prioritized or ranked.

FIG. 4 illustrates an example of applications that have been discovered. In this example, the applications 410, 430 and 440 are operating on a platform 400. The platform 400 may be a container platform and may also include a service mesh or a mesh platform.

In this example, the application 510 has been discovered using a platform API and a mesh API. The information, which includes at least the components or microservices of the application and traffic patterns, allows the topology of the application to be determined. The topology and relationships are represented by the arrows. Thus, traffic may arrive at the MS 412 and then travel or be routed to MS 416 and then to MS 422. Other routes are possible and may depend on the functions invoked or on the particulars of the applications. The application 430 and the application 540 are determined to have topologies as illustrated in FIG. 4.

Based on the traffic patterns, the application 410 includes user-facing 402 microservices (MS) 412 and 414, internal microservices 416 and 418, and low level microservices 420 and 422. The application 430 has user facing microservices 434 and 434 and internal microservice 436. The application 440 has a user facing microservice 442, an internal microservice 444, and low level microservices 446 and 448.

In one example, it is assumed that a user facing microservice is more important than a non user facing microservice. Thus, in the case of an error in the application or system, embodiments of the invention may restore the user-facing microservice before restoring any internal or low level microservices. This would allow, for example, a message to be provided to the user or client that there is an error or that the application is temporarily unavailable while the rest of the restore operation is performed.

The traffic levels can also be used to rank or prioritize various microservices. By monitoring a service mesh, it may be determined that one microservice receives one million hits per day while another microservice receives hundreds of hits per day. Thus, the first microservice is relatively more important and may be restored first or before the second.

Once the topology is determined, one or more factors can thus be used to prioritize the microservices. The factors may include, but are not limited to, user or non-user facing, hits, traffic patterns, workload, metadata, or the like or combination thereof.

Figure 5:
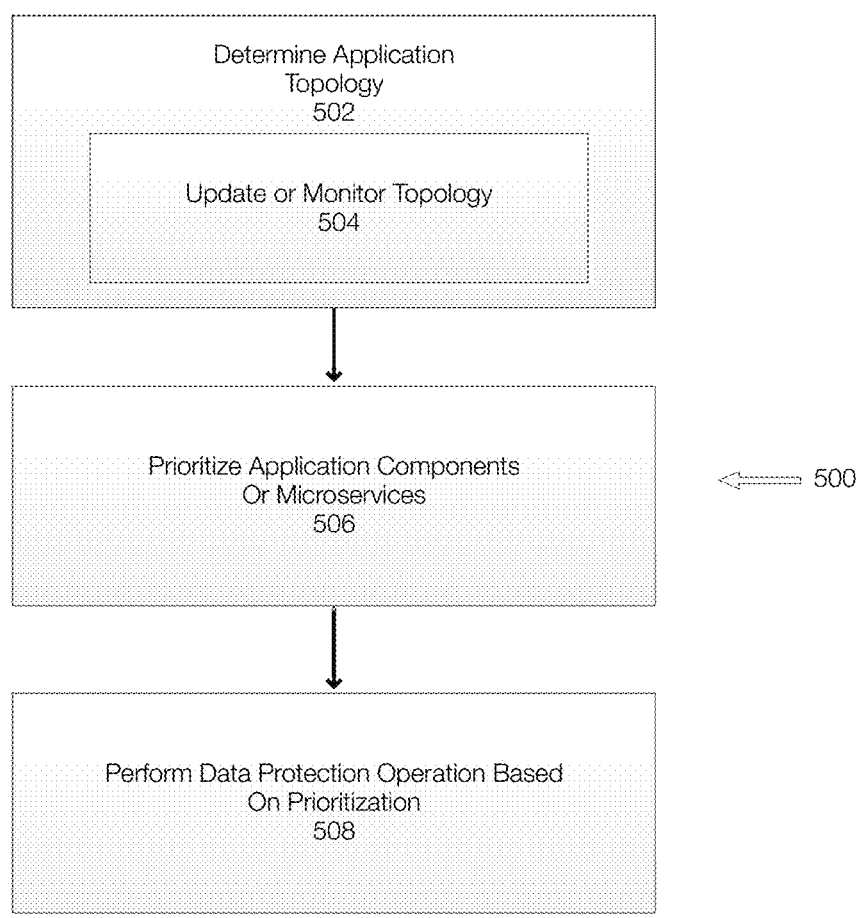
FIG. 5 illustrates an example of performing a data protection operation, which may include discovering an application such as a containerized application.

FIG. 5 illustrates an example of a method for discovering an application. The method 500 may begin by determining 502 a topology of an application. The application may be operating in the context of a container platform and a mesh platform. The container platform is queried to identify the components of the application. The mesh platform may be queried to determine traffic routes or patterns. This information allows a topology of the application to be determined. The topology may be monitored 504 or updated on demand, periodically, or the like. The topology may be determined, for example, by making a query to an appropriate access point or API.

Once the topology is determined, the application components or microservices are prioritized 506 or ranked. Ranking the microservices may consider various factors such as traffic patterns (e.g., hits), ingress and egress traffic, user or non-user facing microservice, or the like or combination thereof.

In one example, the microservices may be ranked by tier. The microservices can be ranked individually as well. Further, some factors may have a higher weight. For example, a user-facing microservice may be placed in the most important tier even if traffic is comparatively low.

In one embodiment, a data protection operation is performed 508 based on the prioritization or ranking. In one example, the most important tier or user facing applications are restored first. The microservices are then restored in order of tier.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    performing a first query to a container platform to determine microservices of an application operating in the container platform;
    performing a second query to a mesh platform to determine relationships between the microservices of the application, the relationships including traffic patterns to and from the microservices of the application;
    determining a topology of the application based on results of the first query and the second query; and
    prioritizing the microservices based on the topology and the results for a restore operation.

2. The method of claim 1, further comprising prioritizing the microservices into a plurality of tiers.

3. The method of claim 2, wherein the plurality of tiers include a first tier, a second tier, and a third tier, wherein the first tier corresponds to microservices that are most important for data protection.

4. The method of claim 2, further comprising determining which microservices are user-facing microservices, wherein the user-facing microservices are placed in a first tier of the plurality of tiers.

5. The method of claim 2, wherein microservices that are not user facing are placed in the second tier or the third tier.

6. The method of claim 1, the relationships further including the traffic patterns between interconnected microservices.

7. The method of claim 6, wherein microservices having traffic patterns that are higher than traffic patterns of other microservices have a higher prioritization.

8. The method of claim 1, further comprising restoring the microservices based on their prioritizations.

9. The method of claim 8, further comprising identifying user-facing microservices, internal microservices, and low level microservices based on the results.

10. The method of claim 9, wherein the user: facing microservices are restored before the internal microservices and before the low level microservices.

11. A non-transitory storage medium having stored therein instructions that are executable by one or more hardware processors to perform operations comprising:
    performing a first query to a container platform to determine microservices of an application operating in the container platform;
    performing a second query to a mesh platform to determine relationships between the microservices of the application, the relationships including traffic patterns to and from the microservices of the application;
    determining a topology of the application based on results of the first query and the second query; and
    prioritizing the microservices based on the topology and the results for a restore operation.

12. The non-transitory storage medium of claim 11, further comprising prioritizing the microservices into a plurality of tiers.

13. The non-transitory storage medium of claim 12, wherein the plurality of tiers include a first tier, a second tier, and a third tier, wherein the first tier corresponds to microservices that are most important for data protection.

14. The non-transitory storage medium of claim 12, further comprising determining which microservices are user-facing microservices, wherein the user-facing microservices are placed in a first tier of the plurality of tiers.

15. The non-transitory storage medium of claim 12, wherein microservices that are not user facing are placed in the second tier or the third tier.

16. The non-transitory storage medium of claim 11, the relationships further including the traffic patterns between interconnected microservices.

17. The non-transitory storage medium of claim 16, wherein microservices having traffic patterns that are higher than traffic patterns of other microservices have a higher prioritization.

18. The non-transitory storage medium of claim 11, further comprising restoring the microservices based on their prioritizations.

19. The non-transitory storage medium of claim 18, further comprising identifying user-facing microservices, internal microservices, and low level microservices based on the results.

20. The non-transitory storage medium of claim 19, wherein the user-facing microservices are restored before the internal microservices and before the low level microservices.

* * * * *